United States Patent [19]

Emenaker et al.

[11] Patent Number: 5,514,237
[45] Date of Patent: May 7, 1996

[54] HEAT SPLICING OF THERMOPLASTIC FILM

[75] Inventors: Ralph R. Emenaker, Hamilton; Richard Perez; Louis P. Burkart, both of Cincinnati, all of Ohio

[73] Assignee: The Procter & Gamble Company, Cincinnati, Ohio

[21] Appl. No.: 132,393

[22] Filed: Oct. 5, 1993

[51] Int. Cl.⁶ .................................................. B65H 69/06
[52] U.S. Cl. .......................... 156/159; 156/157; 156/504; 242/552; 242/556
[58] Field of Search ....................... 156/504, 502, 156/157, 159, 308.2; 242/551, 552, 556

[56] References Cited

U.S. PATENT DOCUMENTS

| | | | |
|---|---|---|---|
| 3,064,869 | 11/1962 | Cooper | 242/556 X |
| 4,001,067 | 4/1977 | Johnson | 156/504 X |
| 4,018,955 | 4/1977 | Klaüke et al. | 156/308.2 |
| 4,172,755 | 10/1979 | Gustafson et al. | 156/504 |
| 4,744,845 | 5/1988 | Posey | 156/159 |
| 4,772,350 | 9/1988 | Gamberini | 156/159 X |
| 4,815,405 | 3/1989 | Young, Jr. | 242/556 X |
| 4,841,053 | 11/1984 | Tokuno et al. | 156/504 X |
| 5,064,488 | 11/1991 | Dickey | 156/159 |
| 5,244,449 | 9/1993 | Totani | 156/504 X |

*Primary Examiner*—Mark A. Osele
*Attorney, Agent, or Firm*—Jeffrey V. Bamber; Steven W. Miller; Kevin C. Johnson

[57] ABSTRACT

A method and apparatus for continuously supplying thermoplastic webbing to an application apparatus is disclosed. In one aspect of the invention, first and second webs of thermoplastic material are held stationary and heat spliced together upstream in a line operation while a downstream segment of the thermoplastic webbing is continuously supplied to an application apparatus downstream in the operation. The heat splicing step is carried out by bringing together first and second opposable splicer clamps to form an overlapping area between the first and second webs and applying a heat impulse to the overlapping area to bond the webs together.

1 Claim, 4 Drawing Sheets

HEAT SPLICING OF THERMOPLASTIC FILM

BACKGROUND OF THE INVENTION

1. Technical Field

The present invention is generally directed to a method and apparatus for supplying a continuous web of thermoplastic material and, more particularly, to a method and an apparatus for heat splicing two or more webs of an elastomeric thermoplastic film to form a continuous webbing which is supplied to a downstream line operation of a continuous manufacturing process.

2. Background Art

Various methods and apparatuses are currently known in the art for autogenously splicing (i.e., without adhesives) thermoplastic webbing or film to provide a continuous supply thereof. For example, various methods and apparatuses for butt welding thermoplastic sheets and films are disclosed in U.S. Pat. No. 3,956,047 which issued May 11, 1976 to Johnson. As disclosed, the method involves bonding a trailing end of one roll of thermoplastic film or sheet material to a leading end of another roll of such material by vertically superimposing the trailing and leading end portions of the two rolls and aligning the lateral edges of said portions over a significant distance sufficient to insure angular alignment of the two rolls at the butt weld. The two portions are severed along a specific transverse line and the severed portions are heated sufficiently to allow the portions to be welded together. The heated end portions are then brought together while maintaining the lateral edge alignment of the portions to form a single continuous sheet.

Alternatively, thermoplastic films or webs may also be spliced under the method disclosed in U.S. Pat. No. 4,129,469 which issued Dec. 12, 1978 to Deverell et al. Under the method disclosed, webs of thermoplastic films can be formed by splicing together two moving webs that are travelling at substantially equal linear speeds. The two moving webs are brought together into surface-to-surface contact and electrostatic charges are deposited upon one or both of the moving webs such that the webs are electrostatically bonded to each other.

Yet another method for splicing together two webs of thermoplastic film is disclosed in U.S. Pat. No. 3,700,532 which issued Jul. 15, 1968 to Pierson. According to the disclosed method, two thermoplastic films are positioned between an anvil and an ultrasonic horn that has planar non-parallel surfaces inclined at an acute angle. The films are stacked on the inclined surface in an overlapping relationship. Once the thermoplastic films have been overlapped, the ultrasonic horn is moved into contact with a portion of the upper film surface having an area at least as great as the area of overlap. Thereafter, ultrasonic vibrations are imparted by the horn to cause the thermoplastic film material to soften such that the overlapping portions unite and form a single film. After a specific period of time, the ultrasonic vibrations are discontinued and the spliced film is allowed to cool for permitting the softened portions of the thermoplastic films to harden. The horn is then withdrawn and the spliced film is removed for replacement with the next set of films.

While such prior art apparatuses and methods for splicing thermoplastic films together have addressed some of the problems associated with autogenously spliced thermoplastic films, they have not addressed the problems to the extent of, or in the manner of, the present invention. For example, and without intending to thereby limit the scope of the present invention, the known prior art has failed to address the problem of feeding a constant supply of an elastomeric thermoplastic film to a downstream line operation of a continuous high-speed manufacturing process while simultaneously splicing a second web of thermoplastic film to the original web of thermoplastic film upstream of the line operation. As will be appreciated, this ability to continuously run the line operation without interruptions or slow-downs leads to greater manufacturing efficiencies.

SUMMARY OF THE INVENTION

The invention provides, in one aspect, a method of continuously supplying a web of thermoplastic material to a downstream line operation by heat splicing two thermoplastic webs to form a continuous thermoplastic web while simultaneously continuing to feed the thermoplastic webbing to the downstream line operation. The method comprises the step of feeding a first web of thermoplastic material under tension between a pair of heat splicing clamps and through the various components of a zero-speed unwind mechanism which are both located upstream in the line operation. In addition, a second web of thermoplastic material is positioned such that its leading end extends between the heat splicing clamps. Upon detection of a low first web condition, a pair of tension clamps, located between the heat splicing clamps and the zero-speed unwind mechanism, are closed such that the first web of thermoplastic material is held stationary to create slack in the portion thereof to be heat spliced. Thereafter, the heat splicing clamps are closed for bringing the leading end of the second web into contact with the first web to form an overlapping area therebetween. Heat is then applied to melt a portion of the overlapping area for creating an autogenous bond therebetween. Thereafter, the heat is removed and the molten thermoplastic material is allowed to cool back to a solidified state. Once the solidified bond is formed, the trailing portion of the first web of thermoplastic material is severed. Next, the heat splicing clamps are opened to allow the spliced second web of thermoplastic material to be advanced downstream in the line operation. Concurrently with the above-described heat splicing operation, the segment of the first webbing retained on the zero-speed unwind mechanism is supplied to the downstream line operation. Thus, the method of the present invention is further directed to continuously feeding a web of thermoplastic material to a downstream line operation while the heat splicing process is being completed.

According to another aspect of the present invention, an apparatus is provided for carrying out the above-noted method of continuously supplying a thermoplastic webbing to a downstream line operation. The apparatus includes a heat splicing mechanism for splicing first and second webs of thermoplastic material together as one of the webs becomes substantially depleted. Through the application of heat and pressure by the heat splicing mechanism to an overlapping section of the first and second thermoplastic webs, the webs are thermally bonded or heat spliced together in the absence of adhesives, bonding agents and the like. The heat splicing mechanism includes a pair of movable clamps having means for positioning a thermoplastic web with respect thereto. In addition, the clamps also include a planar complementary face having means for heating the thermoplastic webs. The heat splicing mechanism also includes means for severing the substantially depleted roll of thermoplastic webbing after the heat splice has been made. Downstream to the heat splicing mechanism, the apparatus also includes a festoon which allows the line operation to continue running while the heat splicing operation is being completed. The festoon includes a complimentary pair of pivotable racks having rollers over which the thermoplastic webbing is positioned. As the thermoplastic webbing is drawn further downstream by the next manufacturing operation, the racks are forced to pivot toward each other for providing a continuous supply of additional webbing. The apparatus of the present invention is operative to continuously supply thermoplastic webbing to the downstream line operation while the upstream heat splicing step is being completed. Once the heat splicing step is completed, the upstream supply of thermoplastic webbing is reactivated such that the racks of the festoon gradually pivot back to their normal position, thus resupplying the festoon for the next heat splicing step.

BRIEF DESCRIPTION OF THE DRAWINGS

While the specification concludes with claims which particularly point out and distinctively claim the subject matter which is regarded as forming the present invention it is believed that the invention will be better understood from the following description which is taken in conjunction with the accompanying drawings, in which:

DETAILED DESCRIPTION OF THE INVENTION

Figure 1:
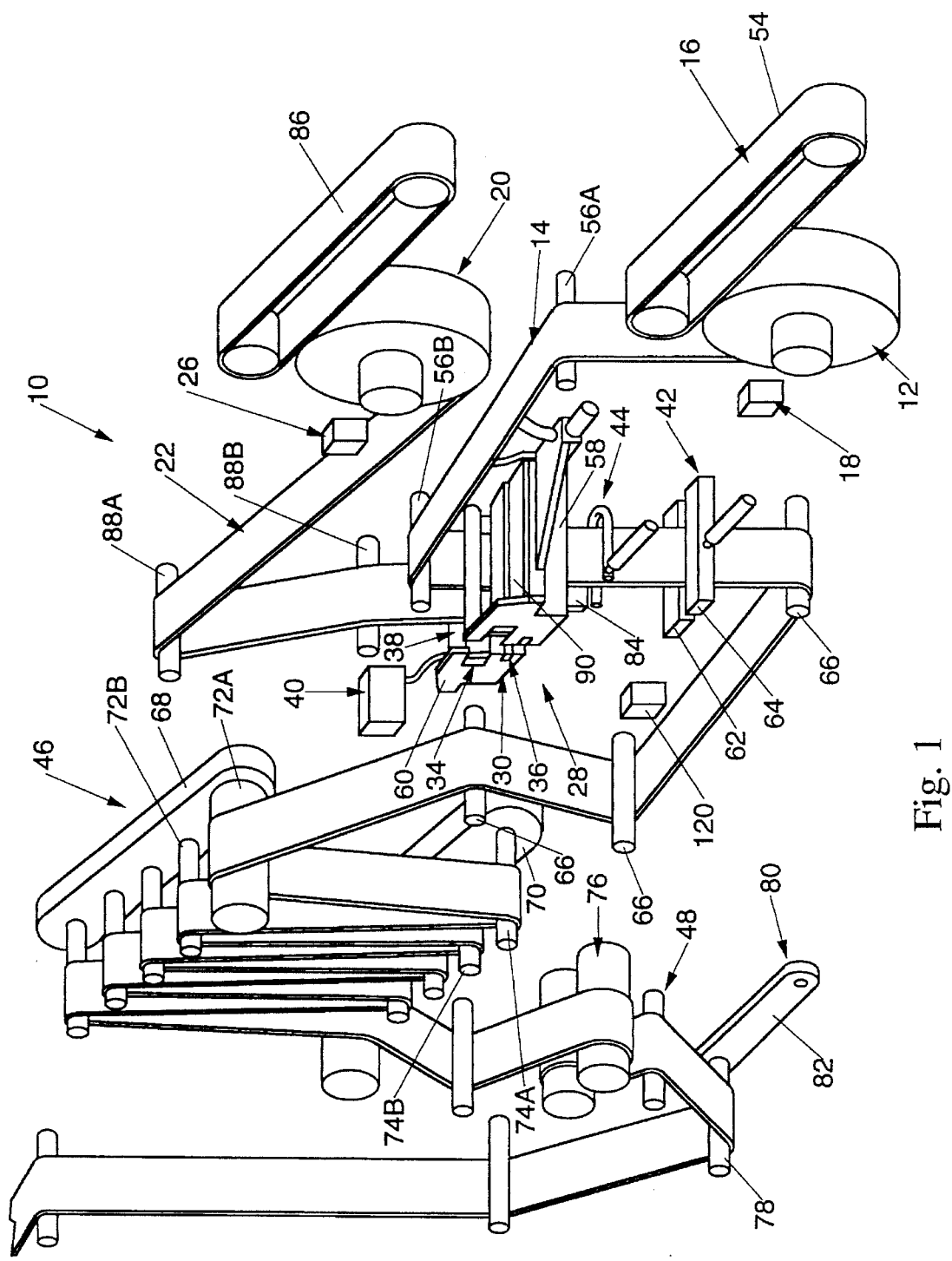
FIG. 1 is a fragmentary, perspective view of an apparatus useful for carrying out the method of the present invention.

With particular reference to FIG. 1, a perspective view of a thermal bonding apparatus 10 is shown which is useful for carrying out the novel method of the present invention. In its most basic sense, the primary components of apparatus 10 include: a first roll 12 of a thermoplastic film or web 14; first driven means 16 for controllably unwinding first roll 12; first detector means 18 for detecting a low roll condition of first roll 12; a second roll 20 of a thermoplastic film or webbing 22; second driven means 24 for controllably unwinding second roll 20; second detector means 26 for detecting a low roll condition of second roll 20; a heat splicing mechanism 28 including first clamp means 30 between which portions of first webbing 14 and second webbing 22 are disposed for exerting a predetermined clamping pressure on overlapping portions thereof, positioning means 34 for positioning the thermoplastic webbing for heat splicing, heater means 36 for applying heat to the overlapping clamped portions of first webbing 14 and second webbing 22 for generating a thermally spliced seam therebetween, and cutter means 38 for severing first web 14 above the spliced seam; temperature control means 40 for controlling the magnitude and duration of the heat applied to the overlapping portions by heater means 36; second clamp means 42 for controlling the tension exerted on the portion of first webbing 14 disposed within first clamp means 30; retractor means 44 for releasing the thermally spliced seam from heater means 36; supply means 46 for maintaining a supply of first webbing 14 downstream of second clamp means 42 which is advanced to the next sequential apparatus (not shown) of the high-speed line operation during actuation of heat splicing mechanism 28; and tensioning means 48 for maintaining a predetermined tension on the segment of first webbing 14 being delivered from supply means 46 to the next sequential apparatus in the line operation. While not shown, it will be appreciated that apparatus 10 is particularly well-suited for use in a fully automated line operation. As such, it is contemplated that a central control device, such as a programmable controller, could be used for controlling actuation of various components of apparatus 10, such as first driven means 16, second driven means 24, first clamp means 30, positioning means 34, cutter means 38, temperature control means 40, second clamp means 42, retractor means 44 and tensioning means 48.

While no particular downstream apparatus is shown, it will be understood that the continuous web of thermoplastic material supplied by apparatus 10 thereto could be advanced to a laminating device, a cutting device, a converting operation, etc., for use in manufacturing various products, such as disposable absorbent articles. For clarity, the method and apparatus of the present invention are particularly well-suited for heat splicing of elastomeric thermoplastic films or webbing, such as Exxon 500 elastomeric film. having anti-blocking compounds incorporated therein which keep the elastomeric film from sticking to itself when stored on a roll over an extended period of time. Such compounds have heretofore inhibited the use of conventional adhesive or tape splicing techniques, thereby facilitating the development and application of the novel method and apparatus of the present invention.

With continued reference to FIG. 1, the various components of apparatus 10 will now be described in greater detail. Upon start up of the high-speed line operation, first roll 12 is unwound by first driven means 16 for feeding first webbing 14 at a predetermined linear speed. In the embodiment shown, first driven means 16 includes a driven unwind belt 54 and a pair of spaced rollers 56A and 56B which maintain first webbing 14 in a relatively "taut" condition. The driven speed of unwind belt 54 and, in turn, first webbing 14 can be controllably varied. First webbing 14 is also shown fed over a first roller 56A and through an opening formed between splicer clamps 58 and 60 of first clamp means 30 and an opening formed between tension clamps 62 and 64 of second clamping means 42. In addition, the segment of first webbing 14 downstream of second clamping means 42 is fed over a plurality of tensioning rollers 66 which lead to supply means 46.

As noted and as will be detailed hereinafter with greater specificity, supply means 46 is adapted to store a predetermined length of first webbing 14 thereon which is sufficient to supply to the downstream apparatus during the heat splicing process. In a preferred form, supply means 46 is a zero-speed unwind mechanism and generally includes a pair of spaced apart pivotable racks 68 and 70 each having a number of non-driven rollers extending therefrom. First webbing 14 is looped over the various rollers on each of the racks 68 and 70 in a successive and alternating fashion, thereby forming a "festoon". In particular, first webbing 14 is looped over a first roller 72A extending from first rack 68 and then over a first complementary roller 74A extending from second rack 70. From there, thermoplastic webbing 14 is looped over a second roller 72 extending from first rack 68 and then back over a second complementary roller 74B extending from second rack 70. As seen, this successive arrangement of thermoplastic webbing continues over a number of complementary rollers extending from first and second racks 68 and 70, respectively. Once first web 14 is looped over the final roller of second rack 70, it then passes on over a driven S-wrap roller device 76 that forms part of tensioning means 48 and which is operable for slightly reducing the linear speed at which first webbing 14 is advanced to generate a predetermined tension in the webbing being delivered downstream. From there, first webbing 14 passes over a roller 78 which extends from a tension regulating device 80 provided for controlling the tension at which the webbing 14 passes to the next downstream apparatus (not shown). Tension regulating device 80 includes a dancer plate 82 which is supported at one end for pivotable movement with roller 74 at its opposite end.

While first roll 12 of thermoplastic webbing 14 is being advanced to supply the downstream apparatus (not shown), a leading end 84 of second thermoplastic webbing 22 is positioned within the opening between splicer clamps 58 and 60 in anticipation of being heat spliced to first webbing 14. As seen, second roll 20 of thermoplastic webbing 22 can be controllably unwound by a driven unwind belt 86 with second webbing 22 passing over a set of rollers 88A and 88B to extend into the opening provided between splicer clamps 58 and 60 of heat splicing mechanism 28. Preferably, leading end 84 of the second webbing 22 extends slightly below the bottom edge of splicer clamps 58 and 60.

In general, splicer clamps 58 and 60 are mirror-imaged units to permit heat splicing of first web 14 to second web 22 or, in the alternative, second web 22 to first web 14. Splicer clamp 60 includes a top substantially horizontal surface 90 which supports cutter means 38 for selectively severing thermoplastic webbing 14 at a point above heater means 36, means 34 in the form of a spring-loaded plate 92 for positioning thermoplastic webbing 14, a stationary anvil 94 and a planar face 96 transverse to horizontal surface 90. Extending at least partially, and preferably completely, across planar face 96 is heater means 36. Heater means 36 preferably includes a metallic band 98, such as a nickel-chromium band, through which an electrically induced heat impulse is selectively applied to the thermoplastic webbing following closure of splicer clamps 58 and 60. As will be explained, the magnitude and duration of the heat pulse generated by heater means 36 is controlled by temperature control means 40 for heating planar face 96 which, in turn, melts overlapping portions of thermoplastic webbings 14 and 22 to be spliced. The remainder of planar face 96 is preferably coated with a composition, such as teflon, which assists in releasing the thermoplastic webbing after the heat splice has been formed. Alternatively, a non-stick component can be integrated into the face 96 to assist in releasing the thermoplastic material after splicing. As noted, splicer clamp 58 is substantially similar in design, movement and operation as splicer clamp 60. Therefore, identical reference numerals having a primed designation are used to indicate identical features of splicer clamp 58.

Figure 2:
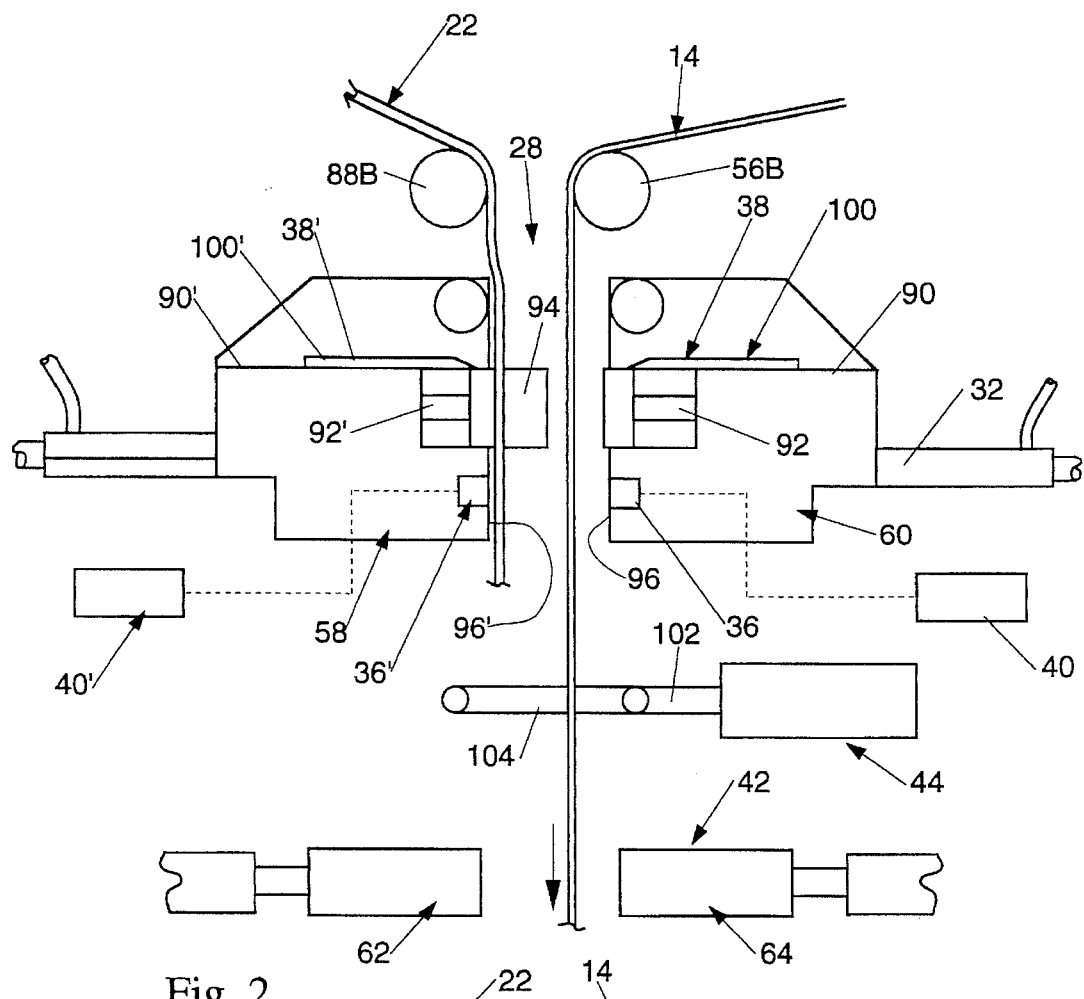
FIG. 2 is a side elevation view of the heat splicing mechanism shown in FIG. 1.
Figure 3:
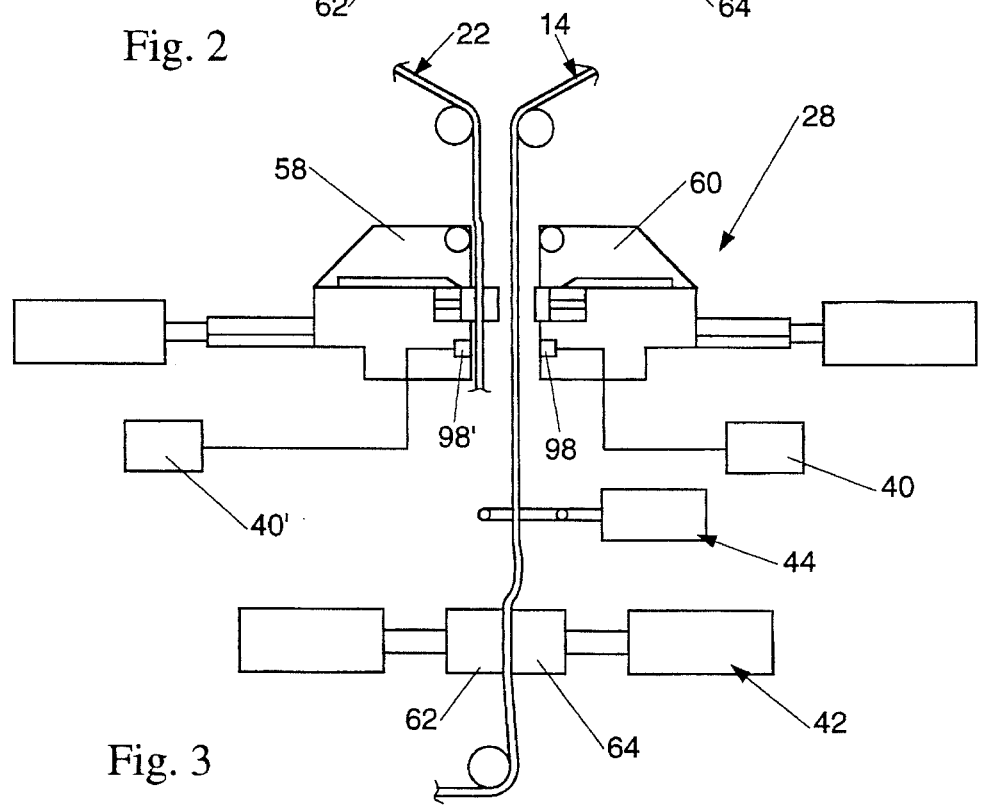
FIG. 3 is a schematic side elevational view of the heat splicing mechanism of FIG. 2 shown just prior to heat splicing of two thermoplastic films.

With particular reference now to FIGS. 2 through 5, the sequence of operations for heat splicing first and second webs 14 and 22, respectively, together upon the detection of a low roll condition will now be described in greater detail. While the following method is disclosed in conjunction with splicing leading end 84 of second webbing 22 to first webbing 14, it will be appreciated that in the subsequent splicing operation, a leading end of a new first roll 12 will be spliced to second webbing 22. Referring particularly to FIG. 2, a fragmentary and somewhat schematic side elevation view is shown for illustrating the positioning of first and second thermoplastic webs 14 and 22 prior to carrying out the heat splicing step as first roll 12 of thermoplastic webbing 14 is being fed downstream. However, upon the continued supply of first thermoplastic webbing 14, first roll 12 becomes substantially exhausted. When first roll 12 of thermoplastic webbing 14 becomes substantially exhausted, first detector means 18 generates an electrical signal to indicate the low roll status of first roll 12. Typically, the signal is received by the central electronic controller (not shown) which is preferably provided for controlling most, if not all, of the driven components of apparatus 10. In response to the low roll status signal generated by first detector means 18, second clamp means 42 is actuated for closing tension clamps 62 and 64. Concurrently, the speed of first unwind belt 54 is ramped down to temporarily discontinue the forward advancement of first webbing 14 from first roll 12. This results in zero tension loading (i.e., loose webbing) being exerted on the portion of first web 14 located within the opening formed between splicer clamps 58 and 60. More particularly, second clamp means 42 is shown in FIG. 3 to be advanced for clamping first webbing 14. As such, tension clamps 62 and 64 are clamped together to inhibit continued advancement of web 14 therethrough. Simultaneously or shortly thereafter, splicer clamps 58 and 60 are advanced toward a closed position upon controlled actuation of actuator means 32 in preparation for performing the heat splicing operation. As the slicer clamps 58 and 60 are advanced the spring-loaded plates 92 and 92' entrap a portion of the first and second thermoplastic webs between the anvil 94 prior to carrying out the heat splicing and web severing steps.

Figure 4:
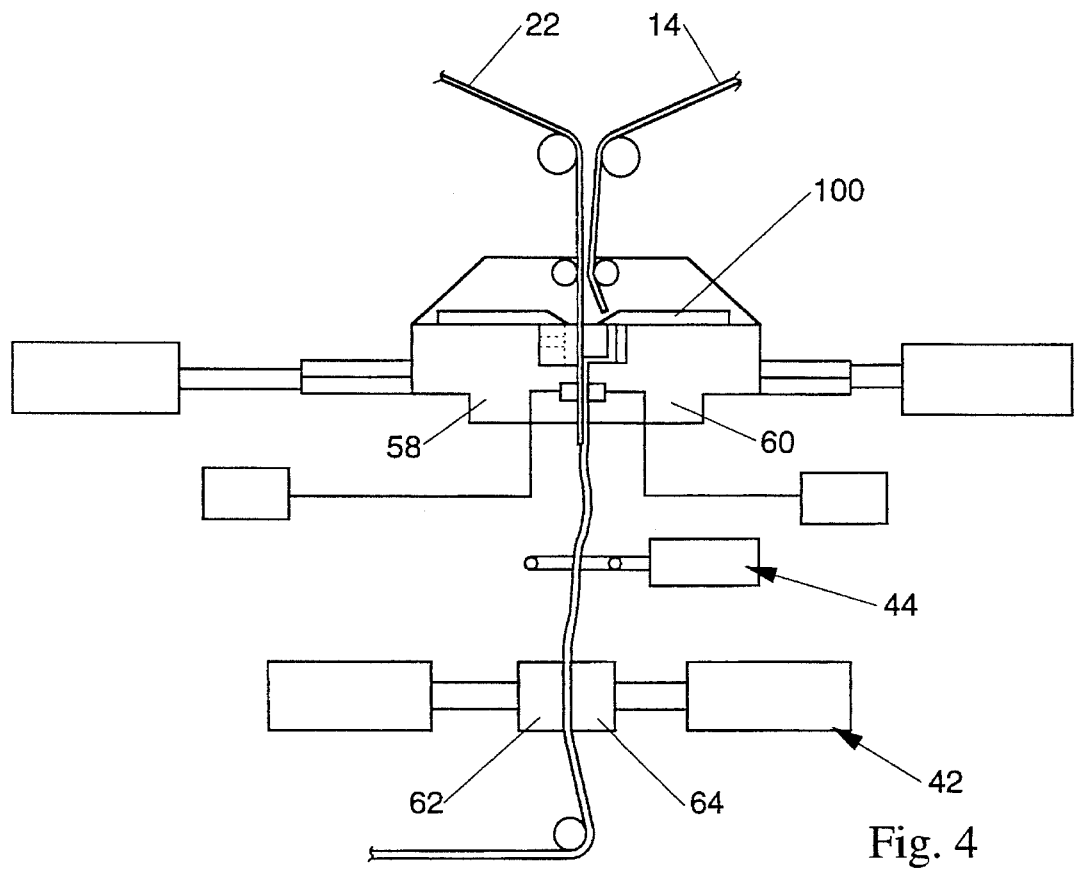
FIG. 4 is a schematic side elevational view, similar to FIG. 3, showing the heat splicing of two thermoplastic films.

From FIG. 4, splicer clamps 58 and 60 are shown closed for entrapping an overlapping portion of both first and second webs 14 and 22, respectively, and exerting a predetermined clamping pressure thereon. Thereafter, heater means 36 is actuated by temperature control means 40 for heating the overlapping portion, thus causing the first and second webs 14 and 22 to melt together. The heat impulse is maintained for a preset time period while splicer clamps 58 and 60 remain closed for an additional time period. More specifically, once the heat impulse ends, splicer clamps 58 and 60 remain closed to allow the spliced thermoplastic webbings to cool and transform from a molten state to a hardened or solidified state. It is to be understood that heater means 36' could also be activated simultaneously with heater means 36 if required for more rapidly melting the overlapping webbings.

Figure 5:
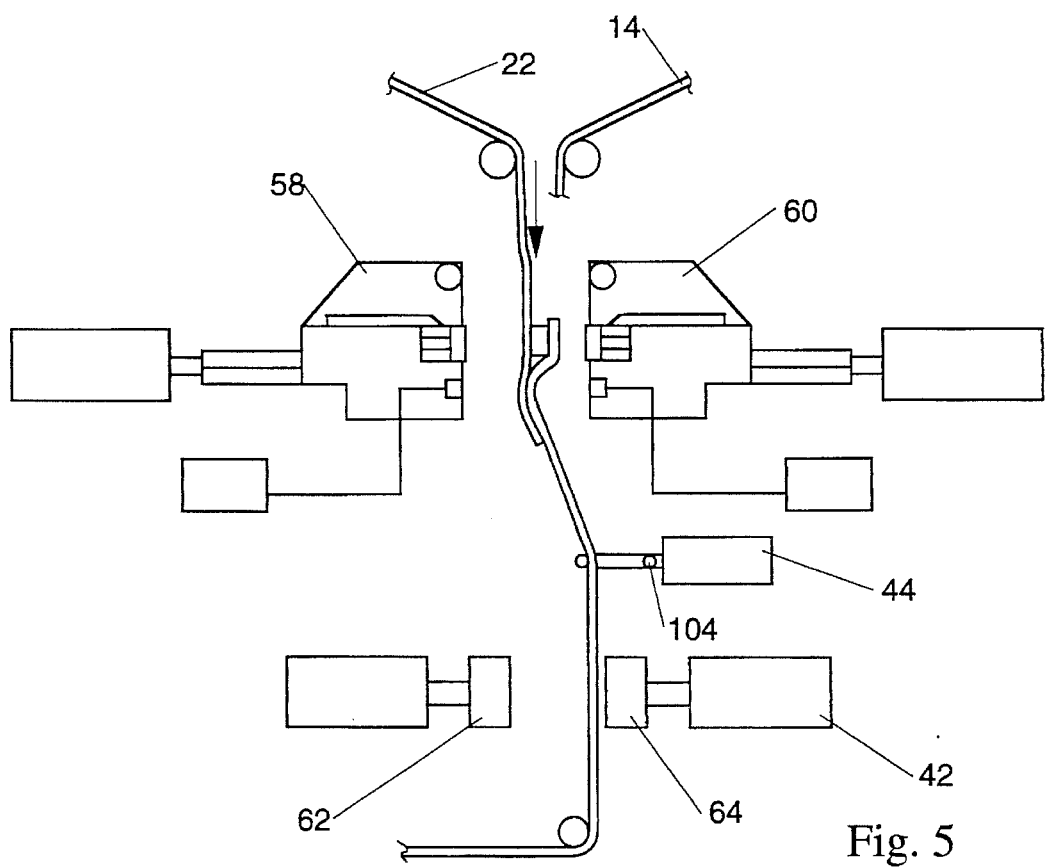
FIG. 5 is a schematic side elevational view, similar to FIGS. 3 and 4, illustrating the release of the heat spliced thermoplastic film.

Simultaneously with the above-described splicing operation, first thermoplastic webbing 14 is severed above the overlapped splice by cutter means 38. More particularly, cutter means 38 includes a retractable knife 100 which is advanced over anvil 94 for severing first web 14 of thermoplastic material. While the spliced thermoplastic webbing is cooling within closed splicer clamps 58 and 60, tension clamps 62 and 64 are released. However, substantially concurrent with splicer clamps 58 and 60 being opened to release the spliced thermoplastic webbing, retractor means 42 is actuated for engaging the now spliced thermoplastic webbing below the splicer clamps 58 and 60 to pull the spliced thermoplastic webbing away from heater means 36 in the event that the spliced thermoplastic webbing is stuck thereto. Retractor means 42 includes a retractable shaft 102 having a U-shaped bar 104 extending therefrom. As seen in FIG. 5, U-shaped bar 104 includes first and second arms which selectively engage the thermoplastic webbing. Thereafter, second unwinder belt 86 is activated to begin feeding the second roll 20 of thermoplastic webbing 22 downstream in the line operation.

Figure 6:
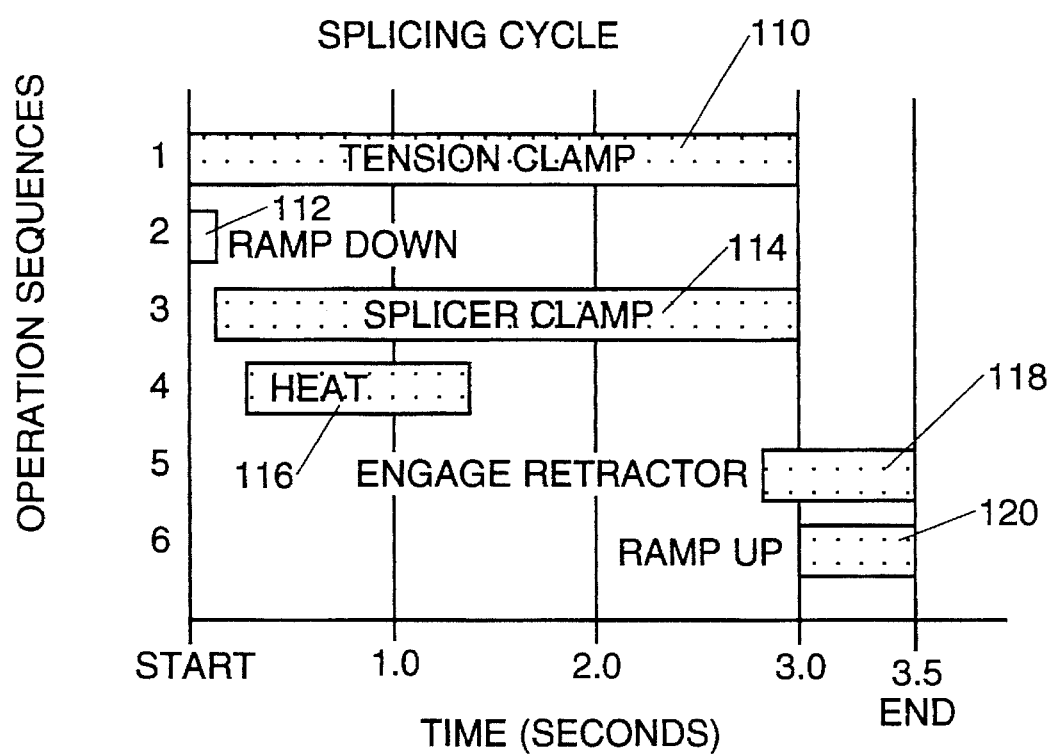
FIG. 6 is an exemplary plot of the cycle times associated with the various steps for heat splicing the two thermoplastic films.

With reference to FIG. 6, an exemplary plot is shown of preferred cycle times for the heat splicing operation which have been found to provide a strong and reliable bond. As can be seen, the splicing cycle lasts approximately 3.5 seconds and includes six primary operation sequences. The first sequence, as indicated by time bar 110, depicts that tension clamps 62 and 64 being held in a closed position for approximately 3.0 seconds. Time bar 112 indicates that the speed of unwind belt 54 of first drive means 16 is ramped down to create a tensionless or "slacked" segment of first webbing between splicer clamps 58 and 60. The third time bar 114 illustrates the closing of splicer clamps 58 and 60 following the ramp down of unwind belt 54. Thereafter, heat, as indicated by time bar 116, is applied. As seen, splicer clamps 58 and 60 remain closed for over 1.5 seconds following the end of the heat pulse. Next, retractor means 42 is shown to be actuated at time bar 118 just prior to the opening of splicer clamps 58 and 60. Finally, time bar 120 illustrates the ramp up speed increase of unwind belt 86 for feeding second roll 12 downstream.

As previously noted, while the above-noted heat splicing operation is being conducted upstream in the line operation, the downstream portion of thermoplastic webbing 14 continues to be fed to the continuous line operation. Thus, supply means 46 and tensioning means 48 cooperatively work together to supply thermoplastic webbing downstream while the overlapping area is being heat spliced together in heat splicing mechanism 28 upstream of in the line operation. Moreover, as the downstream segment of first thermoplastic webbing 14 is advanced, dancer 82 pivots upwardly, generally with resistance. Tension regulating device 80 is generally referred to in the industry as a "dancer", and is typically spring-loaded or hydraulically biased against the direction of pivoting movement. The downstream segment of first thermoplastic webbing 14 is also pulled through S-wrap device 76 with some resistance. As the pull on the thermoplastic webbing causes dancer 82 to pivot to its maximum extent, the thermoplastic webbing looped over and stored on supply means 46 is then utilized. Initially, first rack 68 is caused to pivot downwardly along one end in the direction of second rack 70. As more thermoplastic webbing 14 is advanced, second rack 70 is then forced to pivot upwardly along another end in the direction of first rack 68. Thus, first and second racks 68 and 70 are pivotally rotated to a substantially parallel position, thereby temporarily reducing the area between the first and second racks while the heat splicing operation is being carried out upstream in the line operation. As newly spliced thermoplastic webbing 22 begins to be fed to the line operation following completion of the heat splicing operation, first and second racks 68 and 70 gradually return to their original somewhat oblique positions and dancer 82 pivots downwardly to its normal position.

In order to detect a condition indicative of no webbing being fed through apparatus 10, a third detector means 120 is provided between heat splicing mechanism 28 and supply means 46. Thus, apparatus 10 is provided with means for signalling the downstream line operation of a fault condition to permit the appropriate corrective steps to be taken. Moreover, the heat splice can be easily detected downstream, whereby the final product having the heat spliced portion of the thermoplastic webbing can be identified and rejected.

It should be understood from the above description by those skilled in the art that first and second webs of thermoplastic 14 and 22 material can be added to the line operation in an alternating fashion in the above described manner whenever a low roll amount is detected, thereby allowing the line to run continuously. It should also be understood that while the method and apparatus of the present invention have been described with reference to first and second thermoplastic webs, it is intended that multiple rolls of thermoplastic webbing will be heat spliced together over time to keep the line running. Further, it is contemplated that the first and second webs need not be made from the same material as long as the materials used for the first and second webs are compatible from a thermal bonding standpoint. Due to the ability to continuously run the line operation according to the teachings of the present invention, high quality products can be manufactured with minimal manufacturing down-time.

While particular embodiments of the present invention have been illustrated and described, it would be obvious to those skilled in the art that various other changes and modifications can be made without departing from the spirit and scope of the invention. It is, therefore, intended to cover in the appended claims all such changes and modifications that are within the scope of this invention.

What is claimed is:

1. A method of splicing first and second webs of thermoplastic film with at least one of said webs initially being under tension, said method comprising the steps as ordered of:

(a) providing a first web of thermoplastic material, said first web of material initially being under tension;

(b) providing a second web of thermoplastic material;

(c) creating slack in said first web of thermoplastic material to temporarily reduce the tension in said first web of thermoplastic material;

(d) bringing said second web of thermoplastic material into contact with said first web of thermoplastic material such that a portion of said second web partially overlaps a portion of said first web thereby forming an overlapping area;

(e) applying heat to said overlapping area to bond said webs together; and (f) severing the first web of thermoplastic material immediately upstream of the overlapping area.

\* \* \* \* \*